United States Patent [19]

Tellers

[11] 4,292,929
[45] Oct. 6, 1981

[54] CALF INCUBATOR

[76] Inventor: Donald W. Tellers, R.R. 2, Chaska, Minn. 55318

[21] Appl. No.: 108,238

[22] Filed: Dec. 28, 1979

[51] Int. Cl.³ .................. A01K 1/02; A01K 5/01; A01K 9/00
[52] U.S. Cl. .................................. 119/27; 119/71
[58] Field of Search ............... 119/20, 27, 15, 31, 119/33, 71

[56] References Cited

U.S. PATENT DOCUMENTS

| 1,429,917 | 9/1922 | Abendroth | 119/27 X |
| 2,627,841 | 2/1953 | Johnson | 119/31 |
| 2,672,124 | 3/1954 | McCrary | 119/71 |
| 2,881,733 | 4/1959 | Young, Jr. et al. | 119/15 |
| 3,858,555 | 1/1975 | Smith | 119/20 |

Primary Examiner—Hugh R. Chamblee
Attorney, Agent, or Firm—Dorsey, Windhorst, Hannaford, Whitney & Halladay

[57] ABSTRACT

An incubator particularly useful for calves and the like comprising a wheel supported generally box-like structure with a door to permit placement of the calf into, and removal of the calf from, the incubator, a heat source in the top wall, an opening in the front wall for feeding and a pail support assembly proximate the opening.

14 Claims, 6 Drawing Figures

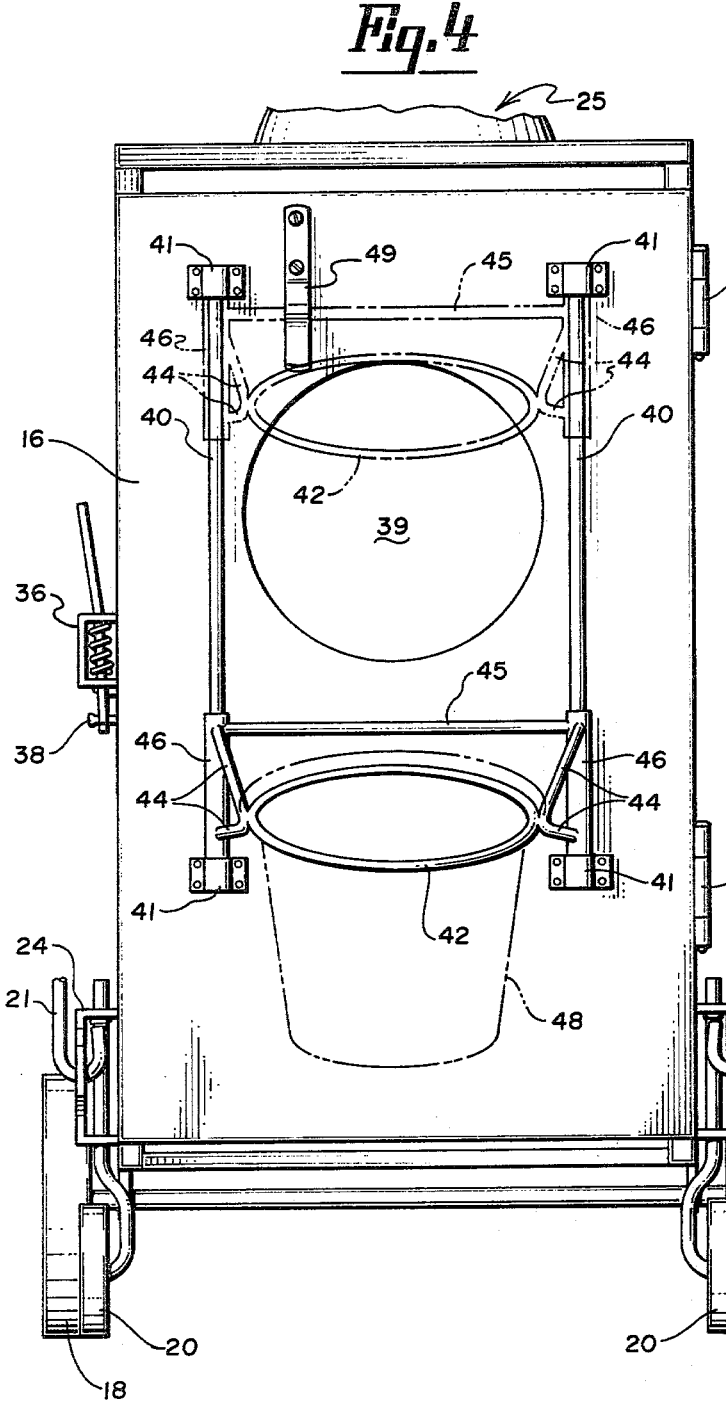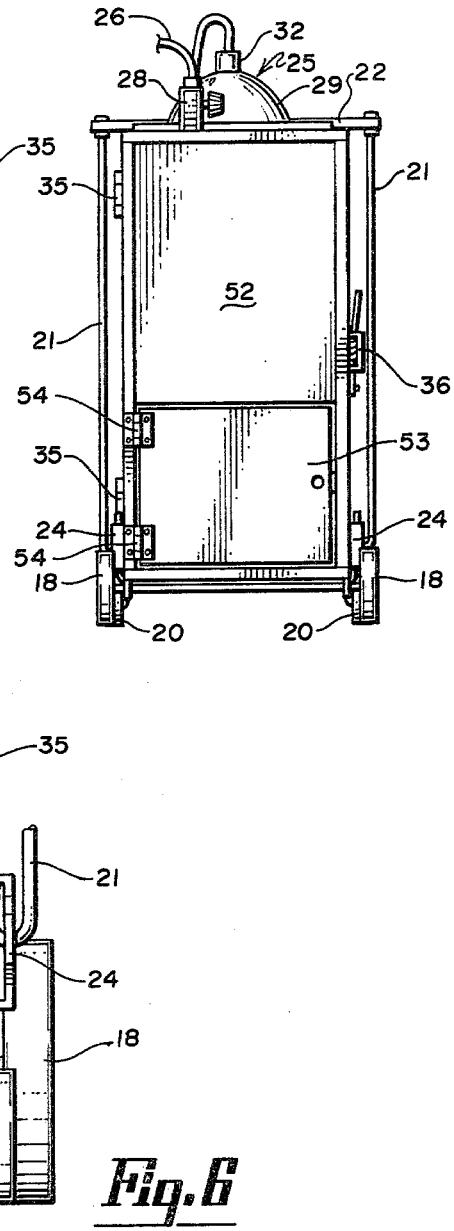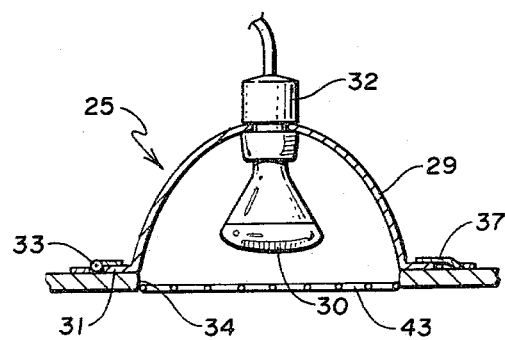

CALF INCUBATOR

BACKGROUND OF INVENTION

The present invention relates generally to a calf incubator, and more particularly, to an improved calf incubator for keeping a newborn or young calf in a heated, non-draft environment.

Incubators of various types have existed in the art for many years. For example, U.S. Pat. Nos. 2,718,210 and 3,584,605 show incubator and heater apparatus designed for use in the poultry industry. However, there appears to be little, if any, apparatus capable of functioning as an incubator for newborn or young calves. As a result, many calves are lost because of chills, sickness, etc., particularly during the winter when the newborn calves are exposed to cold or drafty conditions. Accordingly, there is a need for a calf incubator which can be used by a farmer for keeping a newborn or young calf in a heated, non-draft environment to avoid loss of the calf to chills, sickness, etc.

SUMMARY OF THE INVENTION

The present invention relates to a calf incubator and includes improved means for feeding the calf while housed within the incubator. The general purpose of such incubator is to provide a draft-free, controlled environment for the calf from the time of birth until it is strong enough and able to make it on its own. The particular length of time the calf is kept in the incubator will depend upon the condition of the calf; however, generally the calves are kept in the incubator from time of birth until it is approximately seven days old. Results from using the incubator of the present invention have shown that calves which are kept warm and dry in the incubator atmosphere have a much improved chance of survival through the most critical days of its life. Further, the incubator provides the calf with a much better and healthier start in life than calves not placed in the incubator.

The incubator of the present invention comprises a generally rectangular-shaped incubator box constructed of an insulative material and supported by four wheels. The top cover of the box includes a heat lamp with a control element and thermostat for controlling the heat within the incubator. A hinged door is located at the forward and/or rearward end of the incubator to enable the calf to be easily placed into and taken from the incubator. The forward end of the incubator includes an opening so that the calf can poke its head through for eating purposes. Improved means are also provided on the outside surface of the forward end for supporting a feeding pail or bucket. This means is adjustable to permit the calf to feed from a nipple near the bottom of the bucket or to feed directly from the pail if the calf has been weaned.

Accordingly, it is an object of the present invention to provide a calf incubator for keeping a newborn or young calf in a heated, non-draft enviroment to avoid loss of the calf from chills, sickness, etc.

Another object of the present invention is to provide a calf incubator which is portable and which is constructed of a material having good insulating characteristics.

A further object of the present invention is to provide a calf incubator having a heat source for controlling the environment within the incubator.

Another object of the present invention is to provide a calf incubator having improved means for feeding the calf while in the incubator.

These and other objects of the present invention will become apparent with reference to the drawings, the description of the preferred embodiment and the appended claims.

DESCRIPTION OF THE DRAWINGS

FIG. 4 is a view showing the adjustable pail support assembly of the improved feeding means.

FIG. 5 is a plan view of the back side of the calf incubator of an alternate embodiment.

FIG. 6 is a sectional view showing the connection between the heat source and the top wall of the incubator.

DESCRIPTION OF THE PREFERRED EMBODIMENT

Figure 1:
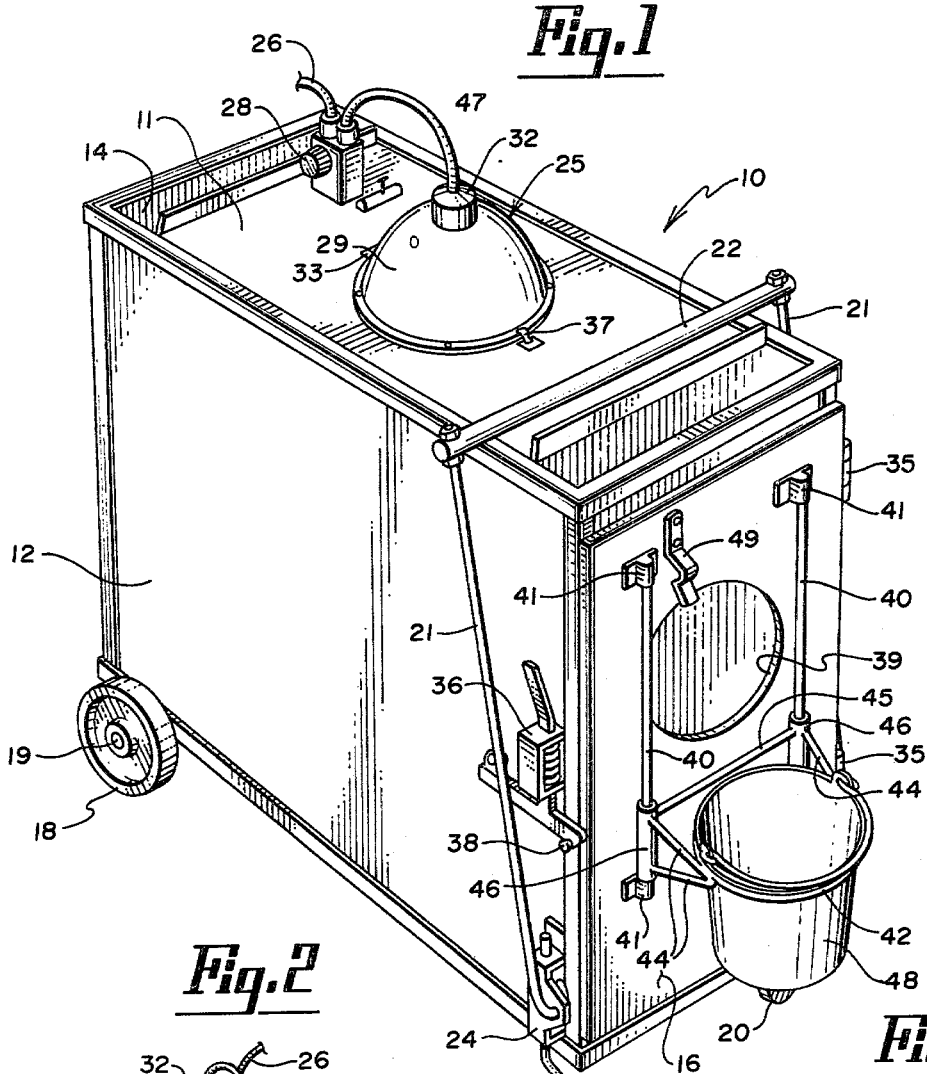
FIG. 1 is a pictorial view of the calf incubator of the present invention.
Figure 2:
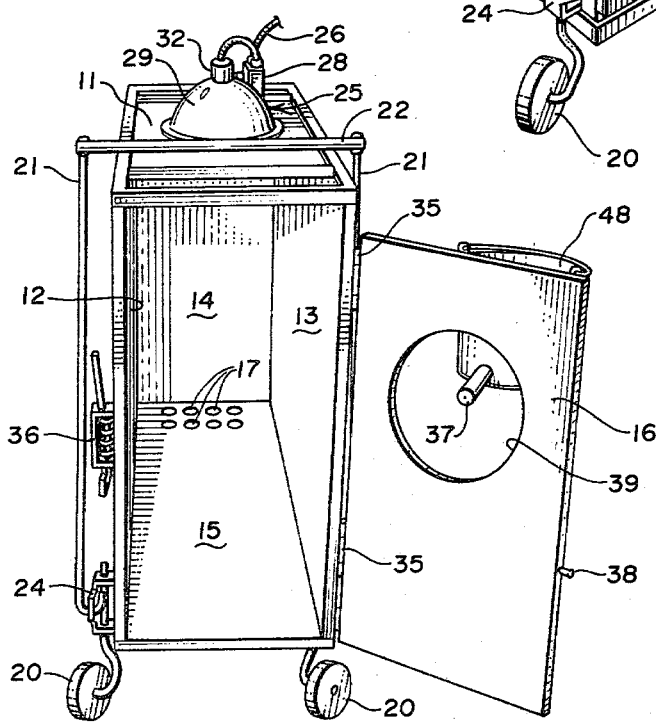
FIG. 2 is a pictorial view of the inside of the calf incubator with the front door open.

Reference is first made to FIGS. 1 and 2 which illustrate the calf incubator of the present invention. The incubator, illustrated generally by the reference numeral 10, comprises a generally rectangular box structure having top and bottom walls 11 and 15, a pair of opposing side walls 12 and 13 and front and rear walls 16 and 14, respectively. Although the various walls can be constructed of a variety of different materials, it is important that the surfaces intended to contact the calf, such as walls 12, 13, 14, 15 and 16, be constructed of a material having insulating qualities such as wood, fiber glass, fiberboard and the like. If these surfaces, particularly the floor surface 15, are constructed of metal or other similar conductive materials, the incubator will not sufficiently retain the necessary heat.

The box-like incubator structure should be compact, but sufficiently large to house a calf. In the preferred embodiment, the incubator is about 18 inches wide, about 48 inches long and about 36 inches high.

The incubator is mounted on four wheels to render the same portable. In the preferred embodiment, the rearward portion of the incubator is supported by a pair of wheels 18 journaled on an appropriate axle 19 while the forward end is supported by a pair of swivel or caster wheels 20. The incubator is also provided with a means for moving the incubator to a desired location. This means includes a pair of elongated side tongue members 21 and a connecting pull bar 22 extending between the outer ends of the pair of side tongues 21. The lower ends of the tongues 21 are connected to a portion of the front wheel mounting brackets 24. As shown, the tongues 21 include curved portions at their lower ends to hook into a portion of the brackets 24, thus enabling the tongues 21 to be pivoted forwardly so that the incubator 10 can be pushed or pulled to a desired location.

The top wall 11 of the incubator 10 is provided with a heat source 25 which is electrically controlled by a rheostat element 28 and a thermostat 47. In the preferred embodiment, the heat source 25 comprises a heat lamp to which electricity is provided via the electrical cord 26. By appropriate electrical connection between the rheostat 28, the thermostat 47 and the heat lamp 25, the intensity of the lamp can be controlled. This in turn controls the heat emitted by the lamp 25 and thus the heat within the incubator. As best illustrated in FIG. 6, the heat source 25 includes a generally cone-shaped housing 29 and a heat bulb 30 screwed into a conventional lamp socket 32. The cone-shaped housing 29 is connected with the top wall 11 by a hinge 33 (FIGS. 1 and 6) and by the clip 37 engaging the peripheral tab 31. This construction enables the housing 29 to be tilted back to change the lamp 30. The cone shaped housing 29 is positioned over an opening 34 in the wall 11 to permit heat from the lamp 30 to enter the incubator. As shown in FIG. 6, a wire mesh grill 43 is secured to the wall 11 to cover the opening 34 and prevent the calf from contacting the lamp 30. Although the preferred embodiment shows the heat source to be a conventional light bulb or heat lamp, various other sources of heat can also be used.

As illustrated in FIG. 2, the floor 15 is provided with a plurality of drainage holes 17 near the rearward end. These holes 17 provide for drainage when the calf urinates.

With reference again to FIGS. 1 and 2 the forward wall 16 of the incubator comprises a hinged door connected with the side wall 13 by a pair of side strap hinges 35, 35. The door 16 can be opened as illustrated in FIG. 2 so that the calf can be placed into and removed from the incubator. A conventional spring latch 36 is mounted on the outer surface of the side wall 12 and is adapted for engagement with a latch post 38 extending outwardly from the door 16. The latch 36 and latch post 38 enable the door 16 to be latched in its closed position. As shown in FIG. 2, the tongue members 21 are spaced sufficiently from the side walls 12 and 13 to avoid interference upon forward movement with the latch member 36, the latch post 38 or the hinges 35, 35.

The forward door 16 also includes a generally circular opening 39 through which the calf can poke its head for feeding purposes and a means for adjustably supporting a feeding bucket or container to facilitate the feeding of the calf. The adjustable feed support system includes a pair of generally vertical, parallel tracks or slide rods 40 which are secured to the front face of the door 16 by a plurality of track mounting brackets 41. In the preferred embodiment, the members 40 comprise rods of generally circular cross section which are mounted in slightly spaced relationship from the door 16 by the mounting brackets 41. The mounting brackets in turn can be secured to the door by screws or any other conventional means. Associated with the pair of slides 40 is a pail support assembly adapted for sliding relationship with respect to the members 40. This support assembly includes a pail support ring 42 having a generally circular configuration and a plurality of braces 44 and 45 extending between the circular pail support ring 42 and a pair of generally cylindrical slide members 46, 46.

As illustrated in FIGS. 1 and 4, the cylindrical members 46 are hollow, thus enabling them to slide along the slide members 40. A pail or feeding bucket 48 is designed to fit within the support ring 42 for supporting the bucket in a feeding position for the calf.

The improved pail support assembly enables the pair or bucket 48 to be supported at one of two positions, a lower position illustrated by the solid lines in FIG. 1 and an upper position illustrated by the broken lines in FIG. 4. A spring latch member 49 is secured to the front wall of the door 16 as illustrated to secure the pail support in its upper position. This is accomplished by spring engagement between the loop in the latch 49 and the brace member 45. When the feeding support assembly is in its upper position as illustrated by the broken lines in FIG. 1, the nipple 37 on the pail 48 is easily accessible to the calf, thus facilitating easy, unattended feeding. For calves that have been weaned, however, the pail can be lowered to the lower position where the calf can feed directly from the pail.

Figure 3:
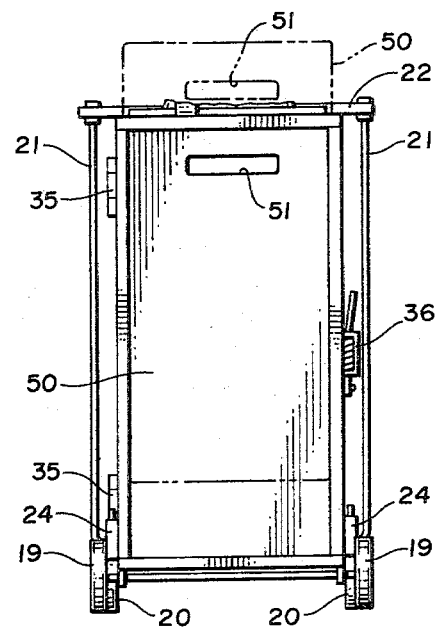
FIG. 3 is a plan view of the back side of the calf incubator of the preferred embodiment.

Reference is next made to FIGS. 3 and 5 showing alternate embodiments for the rearward wall of the incubator. In FIG. 3, the rearward wall 14 is in the form of a sliding door which can be raised to facilitate easy cleaning of the incubator. With this construction, appropriate grooves are provided on opposite sides of the incubator to receive the door 50 in sliding relationship. A handle member 51 is secured to the door to raise the door to an open position.

The construction in FIG. 5 also facilitates easy cleaning of the incubator. With this embodiment, a lower portion of the rear wall 52 is hinged by a pair of hinges 54 to one of the side walls so that the bottom portion of the incubator can be opened for cleaning. It is also contemplated that either of the side walls 12 and 13 could also have an additional door. This door could be hinged as shown in FIG. 5 or it could be a sliding door as shown in FIG. 3. The purpose of such door would be for ease in handling the smaller or weak calf by being able to gently lay the calf in the incubator from the side.

While the description of the preferred embodiment of this invention has been quite specific, it is contemplated that various modifications could be made without deviating from the spirit of the invention. For example, the preferred embodiment contemplates use of the present invention as a calf incubator, however, it could also be used as an incubator for other similar young animals such as lambs, foals, etc. Thus, it is intended that the scope of the present invention be dictated by the appended claims rather than by the description of the preferred embodiment.

I claim:

1. An incubator particularly for calves and the like comprising:
    a wheel supported box-like structure consisting of a single pen structure for a single calf or the like and having front, rear, top, bottom and opposing side walls, at least one of said front and rear walls including a door to permit placement of the calf into, and removal of the calf from, the incubator and at least the front, rear, bottom and side walls constructed of an insulative material to substantially reduce drafts of air into the incubator;
    a heat source disposed in said top wall for providing head to the interior of the incubator;
    an opening in said front wall sufficiently large to permit the calf to poke its head through for eating purposes; and
    a pail support assembly for supporting a feeding pail proximate said opening.

2. The incubator of claim 1 wherein said heat source includes rheostat means for controlling the supply of heat.

3. The incubator of claim 2 wherein said heat source includes a heat lamp.

4. The incubator of claim 1 wherein said front wall comprises a side hinged door.

5. The incubator of claim 1 wherein said pail support assembly includes a feeding pail support movable between a lower position in which the calf can feed from the top of a feeding pail and a raised position in which the calf can feed from a nipple extending from near the bottom of a feeding pail.

6. The incubator of claim 5 wherein said pail support assembly includes vertical slide means and means for slidably connecting said feeding pail support with respect to said slide means.

7. The incubator of claim 6 wherein said slide means includes a vertical slide member positioned on each side of said opening and wherein said pail support assembly includes a latch member for retaining said feeding pail support in its raised position.

8. The incubator of claim 1 wherein at least a portion of said rear wall includes a hinged door to facilitate cleaning of the incubator.

9. The incubator of claim 1 wherein said rear door includes a sliding door to facilitate cleaning of the incubator.

10. The incubator of claim 1 wherein the rearward portion of said floor includes a plurality of holes to provide drainage when the calf urinates.

11. The incubator of claim 1 including a means for facilitating the movement of the incubator from one location to another including a tongue assembly comprising a pair of elongated members each having one end pivotally secured to opposite sides of the incubator and the other ends joined by pull bar means.

12. The incubator of claim 11 wherein said pair of elongated members are sufficiently long to permit the tongue assembly to pivot past said front wall when said tongue assembly is not in use.

13. An incubator particularly for calves and the like comprising:
    a wheel supported box-like structure having front, rear, top, bottom and opposing side walls, at least one of said front and rear walls including a door to permit placement of the calf into, and removal of the calf from, the incubator;
    a heat source disposed in said top wall for providing heat to the interior of the incubator;
    an opening in said front wall sufficiently large to permit the calf to poke its head through for eating purposes; and
    a pail support assembly for supporting a feeding pail proximate said opening, said pail support assembly including a feeding pail support freely movable and non-adjustable between a lower position in which the calf can feed from the top of a feeding pail and a raised position in which the calf can feed from a nipple extending from near the bottom of a feeding pail, said pail support assembly further including a latch member for retaining said feeding pail support in its raised position.

14. The incubator of claim 13 wherein said latch member is secured to said front wall and includes means for engaging a portion of said feeding pail support when said feeding pail support is moved to its raised position.

* * * * *